(12) United States Patent
Helps et al.

(10) Patent No.: US 12,248,425 B2
(45) Date of Patent: *Mar. 11, 2025

(54) DATA FLOW MANAGEMENT

(71) Applicant: XConn Technologies Holdings, Ltd., Grand Cayman (KY)

(72) Inventors: Christopher Helps, El Cerrito, CA (US); Yan Fan, Los Altos Hills, CA (US)

(73) Assignee: XConn Technologies Holdings, Ltd. (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,780

(22) Filed: Mar. 1, 2024

(65) Prior Publication Data
US 2024/0296138 A1  Sep. 5, 2024

Related U.S. Application Data (63) Continuation of application No. 18/211,180, filed on Jun. 16, 2023, now Pat. No. 11,947,483.

(60) Provisional application No. 63/353,503, filed on Jun. 17, 2022.

(51) Int. Cl.
*G06F 13/42* (2006.01)
*G06F 13/12* (2006.01)
*G06F 13/16* (2006.01)

(52) U.S. Cl.
CPC .......... *G06F 13/423* (2013.01); *G06F 13/128* (2013.01); *G06F 13/1673* (2013.01)

(58) Field of Classification Search
CPC ... G06F 13/423; G06F 13/128; G06F 13/1673
See application file for complete search history.

(56) References Cited

U.S. PATENT DOCUMENTS

| | | | | |
|---|---|---|---|---|
| 6,044,406 | A * | 3/2000 | Barkey | H04Q 11/0478 370/231 |
| 6,338,115 | B1 * | 1/2002 | Galbraith | G06F 12/127 711/213 |
| 6,711,170 | B1 | 3/2004 | Brown | |
| 7,779,286 | B1 | 8/2010 | Pritchard | |
| 9,672,151 | B1 | 6/2017 | Ma | |
| 10,915,486 | B1 * | 2/2021 | Khan | G06F 13/4221 |
| 11,455,239 | B1 | 9/2022 | Shah | |
| 11,947,483 | B2 * | 4/2024 | Helps | G06F 13/128 |
| 2001/0032282 | A1 * | 10/2001 | Marietta | G06F 15/17 710/200 |
| 2004/0105384 | A1 | 6/2004 | Gallezot | |
| 2006/0209784 | A1 * | 9/2006 | Cheng Gang | H03M 9/00 370/350 |
| 2014/0052938 | A1 * | 2/2014 | Kim | G06F 12/00 711/154 |

(Continued)

*Primary Examiner* — Phong H Dang
(74) *Attorney, Agent, or Firm* — Van Pelt, Yi & James LLP (57) ABSTRACT

A switch is described. The switch includes a plurality of ports, a plurality of port logic modules, a memory, and a switch fabric. Transactions ingress and egress the switch via the ports. The port logic modules are coupled with the ports. Each port logic module has core clock domain logic for a core clock domain specific to a corresponding port. The memory includes banks. The memory and the switch fabric have a system clock domain. The core clock domain for each of the port logic modules is different from the system clock domain.

14 Claims, 5 Drawing Sheets

(56) References Cited

U.S. PATENT DOCUMENTS

| | | |
|---|---|---|
| 2014/0064271 A1 | 3/2014 | Boden |
| 2015/0026384 A1 | 1/2015 | Maitra |
| 2015/0109024 A1* | 4/2015 | Abdelfattah ... H03K 19/017581 |
| | | 326/41 |
| 2015/0373115 A1 | 12/2015 | Breakstone |
| 2018/0026638 A1 | 1/2018 | Atsatt |
| 2019/0065427 A1 | 2/2019 | Wortman |
| 2019/0197006 A1 | 6/2019 | Teh |
| 2019/0354481 A1 | 11/2019 | Ono |
| 2021/0240655 A1 | 8/2021 | Das Sharma |
| 2022/0188178 A1 | 6/2022 | Bert |
| 2022/0318181 A1 | 10/2022 | Cannata |
| 2023/0017643 A1 | 1/2023 | Shah |
| 2023/0027178 A1* | 1/2023 | Shah ................... G06F 12/0646 |
| 2023/0114164 A1 | 4/2023 | Pal |

* cited by examiner

DATA FLOW MANAGEMENT

CROSS REFERENCE TO OTHER APPLICATIONS

This application is a continuation of U.S. patent application Ser. No. 18/211,180, entitled DATA FLOW MANAGEMENT filed Jun. 16, 2023 which is incorporated herein by reference for all purposes, which claims priority to U.S. Provisional Patent Application No. 63/353,503 entitled DATA FLOW MANAGEMENT filed Jun. 17, 2022 which is incorporated herein by reference for all purposes.

BACKGROUND OF THE INVENTION

In order to accommodate the volume and speed at which data are produced by and desired to be exchanged between processors in a system, such as the central processing unit (CPU), graphics processing unit (GPU), tensor processing unit (TPU), and other artificial intelligence (AI) processors, interconnects (e.g. switches) are desired to have a high data exchange rate. Further, the latency and power dissipation for switches are desired to be reduced. Failure to achieve the desired data exchange rates, latencies and low power dissipation can not only result in critical bottlenecks to system performance, but also increase power consumption. Moreover, system cost may increase if multiple switches are required to provide sufficient communication capacity. Further some interfaces have additional latency and throughput challenges. Consequently, improved mechanisms for transferring data between components are desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some networks, hosts (e.g. processors such as CXL hosts) are connected to physical devices (e.g. physical memory devices such as CXL memory devices) via interconnects (e.g. switches). Data exchange between devices should be seamlessly to allow the processors to perform their tasks at a sufficiently high rate. Further, the exchange of data should be consistent with the protocols and devices used. For example, a Synopsis IP interface ("Synopsis IP") includes controllers and other modules and provides a popular mechanism for exchanging data. Thus, the Synopsis IP, as well as other interfaces, are desired to be supported. However, some interfaces such as the Synopsis IP are sensitive to latencies ("latency-sensitive interfaces") and present challenges. Some such latency-sensitive interfaces utilize not only a request to send data, but also a signal indicating the recipient is ready to receive the data in order to send the data. As a result, throughput for such latency-sensitive interfaces is severely limited by any latency between flow control interface logic for a switch and the interface. Consequently, a mechanism for optimizing throughput and reducing latencies in flow control logic for a switch is desired.

A switch and method for using the switch with latency-sensitive interfaces are described. The switch includes a plurality of ports, a plurality of port logic modules, a memory, and a switch fabric. Transactions ingress and egress the switch via the ports. The port logic modules are coupled with the ports. Each port logic module has core clock domain logic for a core clock domain specific to a corresponding port. The memory includes banks. The memory and the switch fabric have a system clock domain. The core clock domain for each of the port logic modules is different from the system clock domain. In some embodiments, the switch is a Compute Express Link Internet Protocol (CXL IP) switch.

In some embodiments, each of the port logic modules includes a clock domain crossing (CDC) first-in-first-out (FIFO) buffer. The CDC FIFO buffer is configured to manage a transition between the core clock domain and the system clock domain. Each port control logic module is also configured to combine a first number of port streams from the corresponding port to a second number of system streams and to separate the second number of system streams into the first number of port streams. For example, the second number of system streams may include a with data stream and a no data stream (i.e. two streams), while the first number of port streams may include more streams (e.g. six streams). The with data stream corresponds to transactions including a data payload, the no data stream corresponds to the transactions free of the data payload. In some embodiments, the port streams include cache streams and memory streams. The cache streams include a request stream, multiple response streams, and a data stream. The data stream is merged with the memory streams into the with data stream. The request stream and the response streams are merged into the no data stream.

Each port control logic module controls flow through the corresponding port for a host via credit granting. The port control logic module is configured to decrement a pending credit count for the host based on a write request for a pending credit buffer and increment the pending credit count for a read request for the pending credit buffer. Each port control logic module may include routing logic. The routing logic is configured to allow a response transaction to bypass a request transaction and to prevent the request transaction from bypassing the response transaction. In some embodiments, the routing logic includes a router, a request bypass queue coupled to the router, and an arbitrator coupled with the router and with the request bypass queue. The router is configured to route the response transaction to an interface coupled with the corresponding port, to route the request transaction to the arbitrator if the interface can receive transactions, and to route the request transaction to the request bypass queue if the interface cannot receive the transactions. The arbitrator is configured to forward an older request transaction from the router or the request bypass queue.

A method for managing data flow is described. A transaction is received in a port of a plurality of ports of a switch. The switch also includes port logic modules and a core portion. The core portion includes a switch fabric and a memory. The port logic modules are coupled with the ports. Thus, one of the port logic modules is coupled with the port. The core portion of the switch is within a system clock domain. The method also includes controlling, using the port logic module, routing of the transaction through the core portion. The port logic module has core clock domain logic for a core clock domain specific to the port and different from the system clock domain. In some embodiments, the each of the port logic modules includes a CDC FIFO buffer that is configured to manage a transition between the core clock domain and the system clock domain.

In some embodiments, controlling the routing includes combining, using the port logic module, a first number of port streams from the port to a second number of system streams. Controlling the routing also includes separating the second number of system streams into the first number of port streams. For example, system streams may include a with data stream and a no data stream. The with data stream corresponds to transactions including a data payload, the no data stream corresponding to the transactions free of the data payload. Thus, port streams for transactions having a data payload are merged into the with data stream. Port streams for transactions not having a data payload are merged into the no data stream. In some embodiments, the port streams include cache streams and memory streams. The cache streams may include a request stream, a plurality of response streams, and a data stream. The transactions in the response and request streams do not have a data payload. One of the memory streams does not have a data payload. Thus, the response and request streams may be merged with the memory stream having no data payload into the no data stream. The data stream and memory stream having a data payload are combined in the with data stream. In some embodiment, the method includes granting of credits based on reading and writing of a credit buffer. In some embodiments, controlling further includes using the routing logic to allow a response transaction to bypass a request transaction and to prevent, using the routing logic, the request transaction from bypassing the response transaction.

Figure 1:
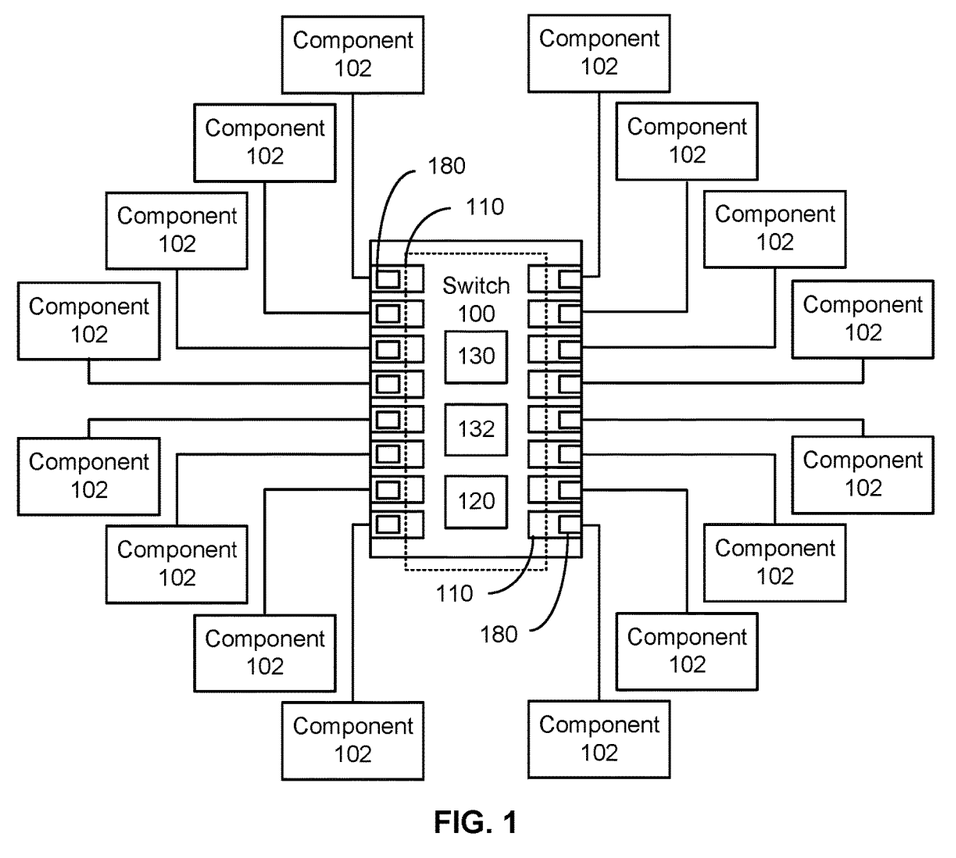
FIG. 1 depicts an embodiment of a switch usable with latency-sensitive interfaces.

FIG. 1 is a block diagram depicting an embodiment of switch 100 that is usable with latency-sensitive interfaces. For clarity, only some portions of switch 100 are shown. Also shown are components 102 coupled via switch 100. Components 102 may include processors (i.e. hosts) such as CPUs, GPUs, and/or TPUs as well as other physical devices, such as memory devices. In some environments, multiple switches 100 and more components 102 may be coupled together.

Switch 100 includes ports 110 (of which only two are labeled), scheduler 120, memory 130, and switch fabric 132. In some embodiments, switch 100 is a PCIe or CXL switch. Although a component 102 is coupled to each port 110 in the embodiment shown, switch 100 may have some port(s) that are not coupled with any component. Although sixteen ports 110 are shown, in some embodiments, switch 100 may have another number of ports. Ports 110 receive data, for example in transaction layer packets (TLPs). Each packet may include a header having control information and a payload including data desired to be transmitted. In some embodiments, each port 110 has sixteen lanes for PCIe communication. Ports 110 may also perform some logical functions. For example, packet headers may be decoded to determine length of the payload (and thus the number of packet segments) within a packet and the destination port 110 or destination component 102. Serialization and/or deserialization may also be performed in each port 110, for example in a serializer/deserializer (SerDes) (not explicitly shown in FIG. 1). Ports 110 may also perform other functions. Consequently, ports 110 include port logic module 180.

A fabric 132 couples memory 130 with ports 110. For example, in some embodiments, a crossbar fabric 132 couples memory 130 with ports 110. Memory 130 may, therefore, store data that ingresses from and/or egresses to any of ports 110. Scheduler 120 is coupled with ports 10 and memory 130. Scheduler 120 allocates portions of memory 130 to store data received at ports 110. In addition, scheduler 120 controls accessing of data from memory 130 to send on to components 102 via ports 110. Thus, traffic from a component 102 ingressing from one port 110 may egress switch 100 at other port 110 and be transferred to another component 102.

Memory 130 includes multiple memory banks (not explicitly shown in FIG. 1) in which packets are stored for transiting between ports 110 through switch 100. In some embodiments, memory 130 includes sixteen banks. Each memory bank may be accessed via a data bus (not explicitly shown) that has a 512-bit width in some embodiments. In some embodiments, each bank includes multiple memory segments. Each memory segment is capable of storing a packet segment. For example, a memory segment may have a length of 64 bytes and each bank may include two hundred and fifty six memory segments. Thus, a packet segment is such an embodiment has a length of 64 bytes (e.g. the maximum length of a packet segment is 64 bytes).

Port logic modules 180 (of which only two are labeled) are also shown. Port logic modules 180 controls flow of traffic through ports 110 and thus to and from the core of switch 100 and components 102. Port logic modules 180 may thus be considered interface control logic. The core of switch 100 includes memory 130, switch fabric 132, and scheduler 120. The core of switch 100 uses a common, system clock (not shown). Thus, the core of switch 100 can be considered to have or be part of a system clock domain. In contrast, port logic module 180 has core clock logic (e.g. a clock) for the port 110 in which port logic module 180 is situated. Consequently, port logic module 180 operates in a core clock domain of the corresponding port. The core clock domain of each port 110 and thus each port logic module 180 is different from another core clock domain of another port and different from the system clock domain. Port logic module 180 has particular logic modules utilized in flow control.

In operation, packets (also termed messages and/or transactions herein) ingress switch 100 through ports 110. Each packet includes one or more packet segments. Port logic module 180 controls the flow of packets, or transactions, between the components 102 and the core. Thus, port logic module 180 controls the flow of packets to and from the corresponding latency-sensitive interface for the port, such as a Synopsis IP interface. Within the core, scheduler 120 allocates memory 130 such that packet segments are stored in multiple banks of memory 130. More specifically, scheduler 120 determines a selected bank in which the beginning packet segment of a packet is stored. This beginning packet segment is stored in the selected bank. Scheduler 120 stores subsequent packet segments in order in the next adjacent bank. Thus, the second segment is stored in the bank next to the selected bank. The third packet segment is stored in the bank two banks away from the selected bank. This process continues until all packet segments have been stored. In some embodiments, scheduler 120 allocates memory in such a manner that memory allocation wraps around to the selected bank if there are more packet segments than memory banks. If there are sixteen memory banks and seventeen packet segments, the selected memory bank stores the first and last packet segments. For example, supposed there are sixteen banks and each bank has a numerical designation starting at 0 and ending with 15. Scheduler 120 may choose bank 3 as the selected bank to store the beginning packet segment. In addition, suppose the packet has seventeen packet segments. For scheduler 120 storing packet segments in ascending order of the banks, the second packet segment is stored in bank 4, the third packet segment is stored in bank 5, and so on. The thirteenth packet segment is stored in bank 15 and the fourteenth segment is stored in bank 0. This continues until the seventeenth segment is stored in bank 3. Alternatively, for scheduler 120 storing packet segments in descending order, the second packet segment is stored in bank 2, the third packet segment is stored in bank 1, the fourth packet segment is stored in bank 0, the fifth packet segment is stored in bank 15, and so on. Thus, each packet is spread across multiple banks.

Thus, switch 100 stores an individual packet in multiple banks of memory 130. Ports 110 thus share memory 130 instead of one bank of memory 130 being dedicated to a particular port. As a result, memory utilization may be increased. Further, switch 100 may be less likely to have ports 110 that are choked. For example, if a particular port 110 is busy, but remaining ports are not, switch 100 may prevent the busy port from being choked by a full memory bank. Further, scheduler 120 may be more efficient. Packet segments are stored deterministically. Stated differently, once the selected bank is identified for the beginning packet segment, the banks for the remaining packet segments are known (e.g. are the next bank in ascending or descending order of banks). Consequently, allocation of memory by scheduler may be more efficient. As a result, the flow of data through switch may be facilitated. Consequently, switch 100 may be better able to serve systems requiring high data exchange rates, such as for ML and HPC applications. In addition, port logic modules 180 are physically close to the latency-sensitive interfaces for which flow is controlled. This may reduce latencies between the interfaces and the port logic modules 180. Port logic modules 180 are also in the same clock domain as the interfaces. Traffic between port logic modules 180 and the interfaces need not cross a clock domain boundary. Crossing clock domain boundaries may introduce latencies. Thus, latencies between port logic modules 180 and the interfaces may be reduced. Further, port logic module 180 may control the flow of traffic across the boundary between the core of switch 100 and the remainder of port 110. Port logic module 180 may configure traffic into the core to reduce latencies, reduce the number of connections in the core, and/or otherwise reduce congestion in the core. Thus, latencies may be reduced and throughput for latency-sensitive interfaces for components improved.

Figure 2:
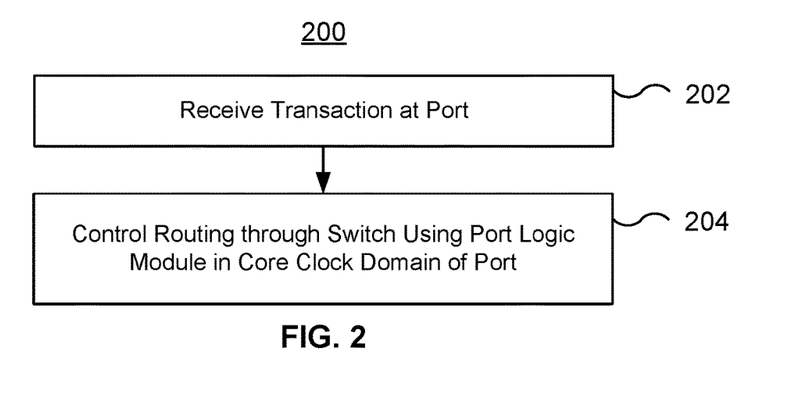
FIG. 2 is a flow-chart depicting an embodiment of managing data flow in a switch usable with latency-sensitive interfaces.

FIG. 2 is a flow-chart depicting an embodiment of method 200 for using a switch in conjunction with latency-sensitive interfaces. For simplicity, only some steps are shown. Further, portions of method 200 may be performed in another order, including but not limited to in parallel. Method 200 is also described in the context of a single switch 100, a particular number of components (or hosts) 102, and port logic modules 180. However, method 200 may be used for other switches, hosts, and/or physical devices as well as for other number(s) of switch(es), host(s) and/or physical devices.

A transaction is received in a port a switch via a latency-sensitive interface, at 202. The switch at which the transaction is received includes a core portion that includes a switch fabric and a memory. The core portion of the switch utilizes a system clock and is within a system clock domain. The switch also includes port logic modules that are coupled with the ports. In some embodiments, the port logic modules are, therefore, within the ports. Thus, one of the port logic modules is coupled with the port.

Routing of the transaction through the core portion is controlled by the port logic module of the port at which the transaction was received, at 204. The port logic module controlling routing is thus in the core clock domain of the port receiving the transaction. Further, the port logic module controls routing through the core of the switch in that the port logic module controls the flow of data across the boundary between the system clock domain and the core clock domain of the port.

For example, a transaction from component 102 may be received at a port 110, at 202. Using port logic module 180, the flow for the transaction is controlled. For example, the ingress of the transaction may be controlled via credit assignment, streams may be merged for routing into the core region of switch 100 (or disambiguated for egress), and ensuring that rules (e.g. related to request and response transactions) are complied with. Thus, the transaction may be routed through switch 100, including use of memory 130, switch fabric 132, and scheduler.

Using method 200, port logic modules that control the flow of data are physically close to the latency-sensitive interfaces and on the same side of the clock domain boundary. Thus, latencies between port logic modules and the interfaces may be reduced. Further, port logic module may control the flow of traffic across the boundary between the core of switch and the remainder of port. Port logic module may configure traffic into the core to reduce latencies, reduce the number of connections in the core, and/or otherwise reduce congestion in the core. Thus, latencies may be reduced and throughput for latency-sensitive interfaces for components improved.

Figure 3:
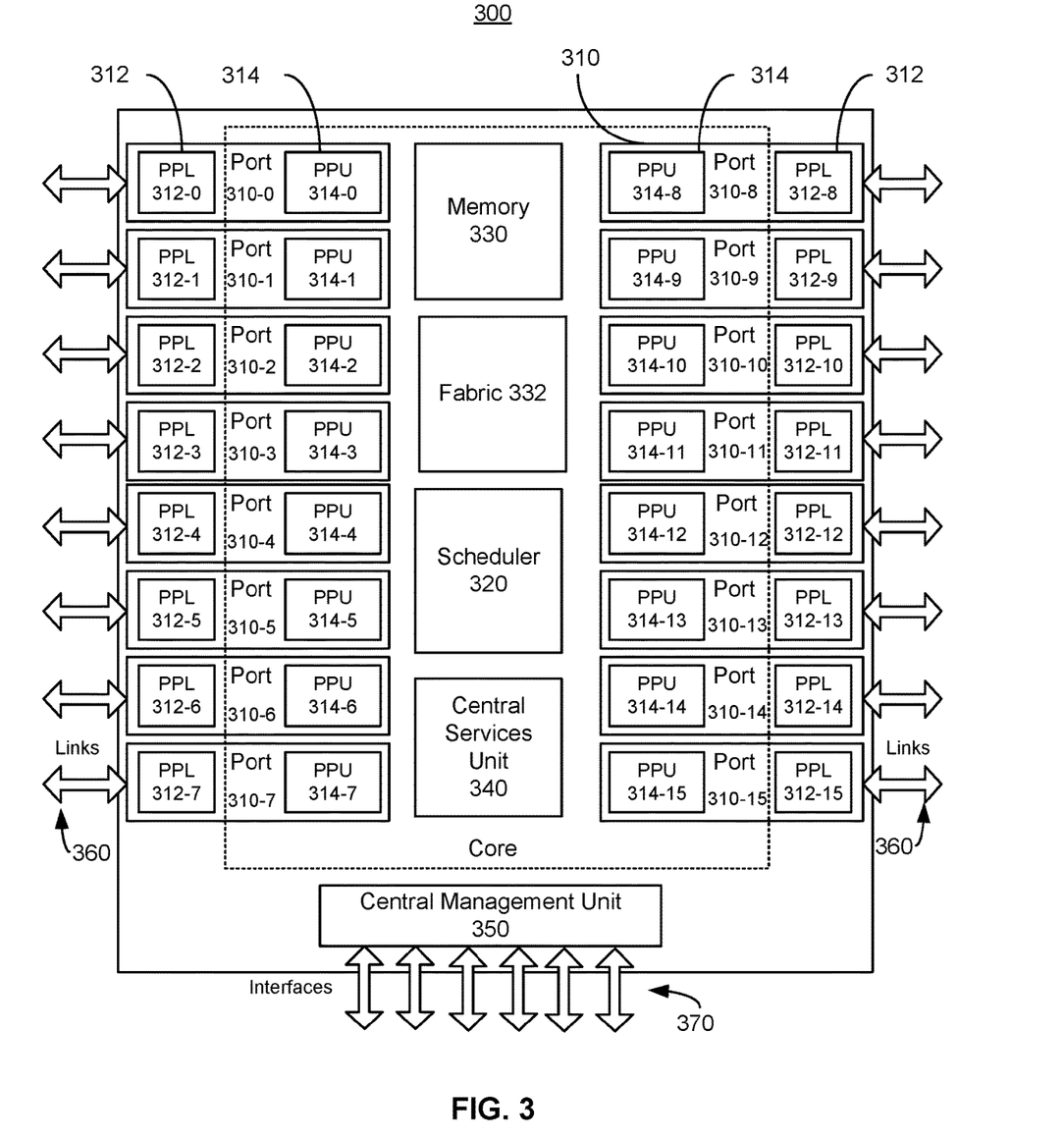
FIG. 3 depicts an embodiment of a switch including a multibank memory and usable with latency sensitive interfaces.

FIG. 3 is a block diagram depicting an embodiment of switch 300 including multibank memory 330. For clarity, only some portions of switch 300 are shown. Switch 300 may be a PCIe or CXL switch and is described in the context of PCIe. However, in some embodiments, switch 300 may be another type of switch.

Switch 300 is analogous to switch 100. Consequently, similar components have analogous labels. Thus, switch 300 includes sixteen ports 310-0, 310-1, 310-2, 310-3, 310-4, 310-5, 310-6, 310-7, 310-8, 310-9, 310-10, 310-11, 310-12, 310-13, 310-14, and 310-15 (collectively or generically ports 310). Ports 310, scheduler 320, switch fabric 332, and memory 330 are analogous to ports 110, scheduler 120, switch fabric 132, and memory 130, respectively. Also shown are central services unit 340, central management unit 350, PCIe links 360 for ports 310 and interface 370.

Central services unit 340 includes one or more functional units. For example, central services unit 340 may include one or more of: a bootstrap controller that is used at startup to set internal registers, repair internal memories and initialize switch 300; a clock generator that generates a core clock, generates derived clocks, distributes the clock signals to the appropriate units and, in some embodiments, generates clock enables to gate clocks when the corresponding units are not in operation; reset generator that provides the proper resets during initialization and soft resets; power manager that receives power management messages and facilitates entrance to and exit from the PCIe link; interrupt processor that generates the interrupts; error processor that detects errors and generates error messages; register access controller that responds to requests (e.g. from central management unit 350); and TLP generator that generates TLPs for performance analysis and debugging. In some embodiments, one or more functional units may be omitted and/or performed in another manner/by another component.

Central management unit 350 provides access via the corresponding interfaces 370. For example, central management unit 350 may be used to Flash memory (not shown) through one of the interfaces 370 shown during initialization. Central management unit 350 may also provide slave interface to access on-chip registers, provide communication to switch 300 during debugging and testing, and send/receive other signals via the interfaces 370.

Each port 310 performs some processing of packets in the embodiment shown. Thus, each port 310 includes a PCIe port logic (PPL) and packet processing unit (PPU). For other types of switches, other port logic may be used. PPLs 312-0, 312-1, 312-2, 312-3, 312-4, 312-5, 312-6, 312-7, 312-8, 312-9, 312-10, 312-11, 312-12, 312-13, 312-14, and 312-15 (collectively or generically PPLs 312) and PPUs 314-0, 314-1, 314-2, 314-3, 314-4, 314-5, 314-6, 314-7, 314-8, 314-9, 314-10, 314-11, 314-12, 314-13, 314-14, and 314-15 (collectively or generically PPUs 314) are shown. PPL 312 and PPU 314 perform various functions for port 310. Although described as separate functional units, in some embodiments, the functions of PPL 312 and/or PPU 314 may be performed in another manner and/or by another device.

PPL 312 interfaces with the devices coupled via links 360. Link 360 may be a PCIe×16 link. Thus, PPLs 312 may interface with GPUs, TPUs, FPGA Accelerators, and other CPUs through links 360. In some embodiments, the link speed can run up to 32 Gb/s Per lane, and the total aggregated bandwidth is 512 Gb/s Per Port. Thus, each port 310 has sixteen lanes in the embodiment shown. In some embodiments, another number of lanes and other speeds may be used. PPL 312 includes one or more SerDes/PCS (not shown) and PCIe media access control (MAC) Controller (not shown). In the ingress direction, the incoming packets pass through SerDes/PCS and MAC controller of PPL 312. The headers are decoded into individual fields and sent to the corresponding PPU 314. In the egress direction, PPL 312 receives packet headers and data information from PPU 314. PPL forms the packets (i.e. forms TLPs) and transmits them via the corresponding link 360 in a bit-stream format. PPU 314 parses the header information to determine the packet type and destination port (if the packet is to be forwarded to another port). For a packet ingressing via port 310, PPU sends the payload to memory 330 (in a manner as determined using scheduler 320) for temporary on-chip storage. In some embodiments, packet information (e.g. header information and the information regarding the location of the packet in memory 330) may be stored in port 310, for example in a virtual output queue (VOQ) described below.

Scheduler 320 allocates memory segments in banks of memory 330 and into which PPUs 314 to store packet segments. The specific scheduling processes (e.g. strict priority, weighted round robin) for packets that ingress switch 300 through a particular port 310 and egressing through various other ports 310 may also be selected by scheduler 320. As discussed with respect to method 200 and switch 100, scheduler 320 allocates memory such that a selected bank is identified to store the beginning packet segment, the beginning packet segment is stored in the selected bank, and subsequent packet segments are stored in the next adjacent banks. Scheduler 320 also controls retrieval of packet segments from memory 330 to be sent to an egress port 310.

Memory 330 has multiple banks configured such that packet segments from any of ports 310 may be stored in any bank. Thus, memory 330 may be coupled with ports 330 via a crossbar or analogous fabric of interconnections. Thus, memory 330 may be considered a multibank memory fabric. In some embodiments, memory 330 includes sixteen banks of memory. In other embodiments, another number of banks may be present. Each bank of memory 330 includes multiple memory segments. In some embodiments, each memory segment is a sixty-four byte segment. Other segment sizes, including variable memory segment sizes, may be used in some embodiments. In some embodiments, memory segments in a bank that store packet segments from the same packet need not be continuous. For example, if a bank stores two (or more) packet segments from the same packet in two memory segments, the two memory segments need not be contiguous. Thus, the two memory segments may be physically separated (i.e. not share a border) in the bank. In some embodiments, the two segments might share a border. In some embodiments, the packet segments are stored in a next available segment in a particular bank. Thus, the physical locations (e.g. addresses of memory segments) for two packet segments may or may not adjoin.

PPLs 312 also include port logic modules (not explicitly shown in FIG. 3). Port logic modules may be used in connection with latency-sensitive interfaces, as described herein. Also indicated in FIG. 3 is the core. Some or all of the core uses a system clock and operates in the clock domain. Thus, memory 330, switch fabric 332, scheduler 320, central services unit 340, and, in some embodiments, PPUs 314 use a system clock domain. In contrast, each PPL 312 is in the core clock domain of the corresponding port 310.

In operation, packets, ingress switch 300 through ports 310. Packets are processed via PPLs 312 and PPUs 314. Port logic modules in PPLs 312 may utilize method 200 to control flow from the latency-sensitive interface (e.g. via links 360) to the core. Scheduler 320 allocates memory 330 for packet segments to be stored in multiple banks of memory 330. PPUs 314 provide the packet segments to memory 330 for storage. Scheduler 320 determines a selected bank in which the beginning packet segment of a packet is stored. This beginning packet segment is stored in the selected bank. Scheduler 320 stores subsequent packet segments in order in the next adjacent bank. Thus, the second segment is stored in the bank next to the selected bank. The third packet segment is stored in the bank two banks away from the selected bank. This process continues until all packet segments have been stored. In some embodiments, scheduler 320 allocates memory in such a manner that memory allocation wraps around to the selected bank if there are more packet segments than memory banks.

Switch 300 shares the benefits of switch 100. Individual packets are stored across multiple banks of memory 330. As a result, memory utilization may be increased, transfer of packet across switch 300 may be improved and scheduler 320 may be more efficient. Consequently, switch 300 may be better able to serve systems requiring high data exchange rates, such as for ML and HPC applications. Further, port logic modules of PPLs 312 that control the flow of data are physically close to the latency-sensitive interfaces and on the same side of the clock domain boundary between the system clock domain and the core clock domain. Thus, latencies between port logic modules and the interfaces may be reduced. Further, port logic module may control the flow of traffic across the boundary between the core of switch and the remainder of port 310. Thus, latencies may be reduced and throughput for latency-sensitive interfaces for components improved.

Figure 4:
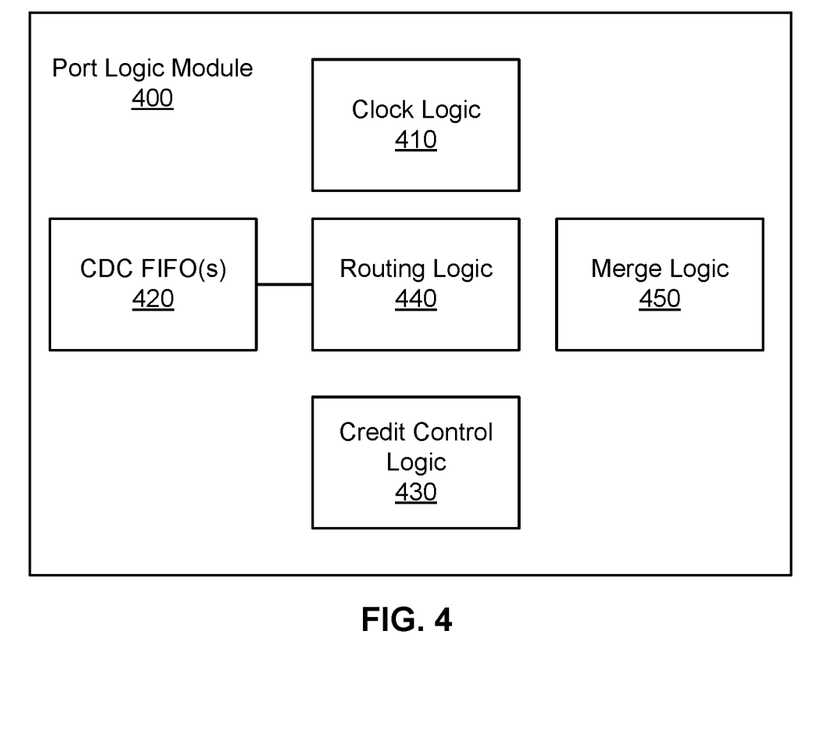
FIG. 4 depicts an embodiment of a port logic module usable with latency-sensitive interfaces.

FIG. 4 depicts an embodiment of port logic module 400 usable with latency-sensitive interfaces, such as Synopsis IP. For clarity, only some portions of port logic 400 are shown. Port logic module 400 may be part of a PPL, such as PPL 312. However, in some embodiments, port logic module 400 may be used in another type of switch.

Port logic module 400 includes clock logic 410, clock domain crossing (CDC) first-in-first-out (FIFO) buffer. Clock logic 410 may be used in connection with the core clock (not shown) for the port in which port logic module 400. CDC FIFO buffer 420 is for use in storing traffic that crosses the clock domain boundary between the core clock domain for port logic module 400 (and the port in which port logic module 400 resides) and the system clock domain for the core portion of the switch. Merge logic 450 is used to combine streams ("port streams") of traffic ingressing the switch from the interface and to disambiguate (e.g. separate) streams ("system streams") egressing from the core of the switch to the interface. Credit control logic 430 is used to assign credits to the interface (or the component coupled with the port) for sending transactions to the switch. Routing logic is used in enforcing certain policies, such as the relationship between requests and responses.

Port logic module 400 addresses routing congestion between the PPLs and the switch core, which may limit otherwise performance. For example port logic module 400 reduces the number of connections between major functional blocks, such as the PPL blocks (in which port logic modules 400 reside) and the core of the corresponding switch. Each port in which port logic module 400 resides is connected to either a host (upstream port) or a device (downstream port), but not both. Latency-sensitive interfaces may be used for both. To reduce the number of signals passed to the core, only the signal set appropriate for each port (e.g. upstream/host or downstream/device), based on whether that port has been configured as upstream or downstream. Thus, port logic module 400 uses a host signal set for ingress and the device set for egress at an upstream port. Port logic module 400 uses a host signal set for egress and the device set for ingress for a downstream port. Thus, traffic passes through only one of the host or device signal sets for the latency-sensitive interface, depending on whether the port is configured as upstream or downstream.

Each port has port streams. For example, a port may have four cache streams (or cache channels) and two memory streams (or channels) for ingress. Similarly, each port has four cache streams and two memory streams for egress. Along with the PCIe traffic, these streams are merged into fewer streams ("system streams") for entry into and routing through the switch core. Instead of connecting all of these port streams to the core, and then merging them, the cache and memory streams are combined into fewer streams by port logic module 400. For example, the port streams may be merged into two system streams. In some embodiments, these streams are a with data stream (with data payload) and a no data stream (no data payload). This drastically reduces connections to the core. Further, clock domain crossing (CDC) between the clock domain of the port/port logic module 400 and the system clock domain on the merged streams. This reduces the number of CDC FIFOs required, for example from six to two.

Port logic module 400 also utilizes credit queues for ingress and egress. For each interface, port logic module 400 passes credits to the interface, which will send only as many CXL messages as it has been granted credits. The credits are granted via a single credit signal. The credit count is incremented (up to a maximum of eight) for every clock cycle on which the credit signal is asserted. The credit count will be decremented for each message sent.

In some embodiments, an 8-deep message queue with credit tracking logic is used. The credits sent to the interface are controlled via a pending credits count. This count is initialized to the number of empty slots in the queue. Once the interface becomes active, this count is decremented for each credit sent to the interface and incremented (saturating at 8) for message read from the queue. It is not necessary to adjust the count when messages are received from the interface because the interface sends one message for each credit granted.

When arbitrating between the cache streams, a request transaction must not pass response messages. This policy is enforced via port logic module 400.

The no data and with data streams from the switch core are each converted to the core clock domain using CDC FIFO 420. In some embodiments, flags are used to separate the data streams (i.e. the system streams) into the appropriate cache and memory streams (i.e. port streams). For ingress, there are two input system streams, no data and with data. These system streams are first passed through a memory pooling block. If the port is a host port, memory pooling is enabled, and the message is a mem transaction (identified by flags), the address and tag fields in the messages are replaced. The messages are passed to port routing logic 440, which will determine the destination port based on the address (for mem requests), a fixed port address from a register (cache messages), the upstream port (mem responses (memory pooling disabled) or the tag field (memory pooling enabled). The separate no data and with data streams will be merged using round-robin arbitration, and a flag added to indicate whether no data or with data.

Next, the CXL message stream is merged with PCIe traffic, for example using round-robin arbitration. For PCIe packets with multi-beat payloads, arbitration may be locked until the entire payload has been transferred. Finally, the merged streams are split into header and payload, which will be routed to the appropriate functional blocks (e.g. the header to the scheduler 320, the payload to the shared memory banks 330.

In some embodiments, an egress port receives a single header from the selected ingress port. The added flags are used by port logic module 400 to separate CXL from PCIe headers. CXL headers may then be sent to the CXL egress logic. Flags may also be used to separate no data streams and with data headers. For no data streams, the header is pushed into a queue to be sent to the PPL. For with data streams, the header is pushed into the with data header pending queue to wait for the payload to be retrieved. Once the payload is ready, it is combined with the data header and sent to the PPL.

To retrieve a payload, a request is sent to the ingress port from which the header was received. PCie and CXL header have different latencies in the egress logic. Even though the current header may be a CXL WD requesting a payload, and older PCIe header could be requesting its payload simultaneously. The PCIe and CXL requests are arbitrated, and the winning request is passed back to the appropriate ingress port. Because there will be a long delay until the payload arrives, a flag indicating whether the request was CXL or PCIe is pushed into a queue, to be retrieved later when the payload arrives.

Figure 5:
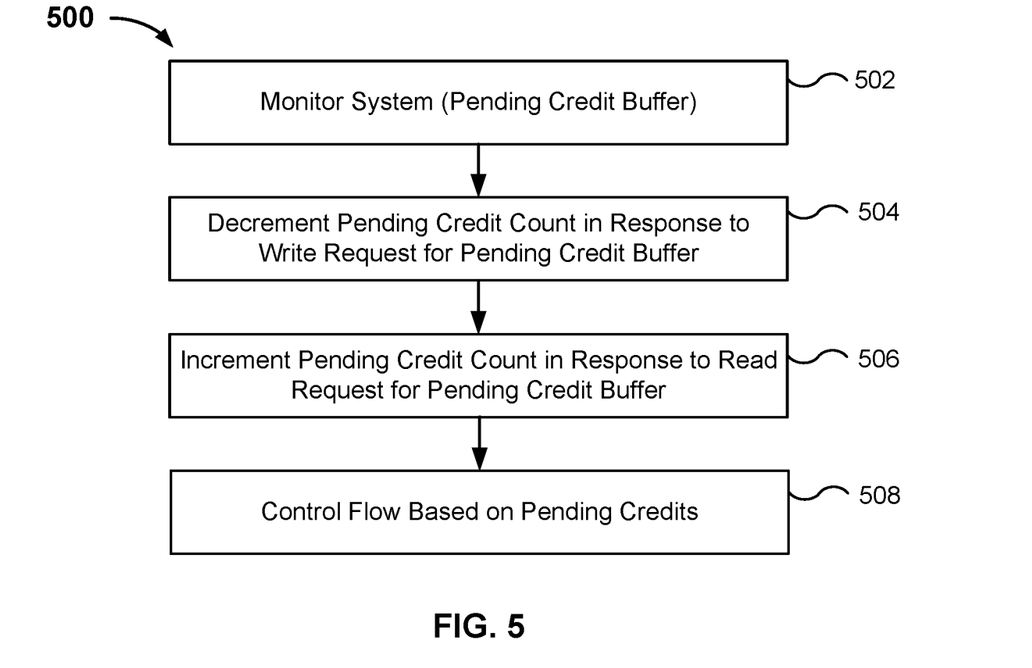
FIG. 5 is a flow-chart depicting an embodiment of a method for assigning credits usable with latency-sensitive interfaces.

Thus, port logic module 400 may perform various flow control functions to mitigate latencies and congestion. As a result, throughput through the switch FIG. 5 is a flow-chart depicting an embodiment of method 500 for assigning credits usable with latency-sensitive interfaces. More specifically, method 500 manages the pending credits for the interface. For simplicity, only some steps are shown. Further, portions of method 500 may be performed in another order, including but not limited to in parallel. Method 500 is also described in the context of a single switch 300 including port logic module 400. However, method 500 may be used for other switches, hosts, and/or physical devices as well as for other number(s) of switch (es), host(s) and/or physical devices. Method 500 also starts after the pending credit count has been initialized (e.g. to the number of slots in the buffer).

The number of credits indicates the number of messages that can be accepted. The assignment of credits is based upon a credit grant signal as well as the number of credits that are utilized. More specifically, the number of credits available (pending credits) should be incremented for each clock period for which the credit grant signal is high. The number of credits available should be decremented for each message sent (i.e. each credit used). The number of credits available does not change if both a message is sent and the credit grant signal is high for a particular clock cycle. This is because a new credit is made available while an older credit is utilized.

Credit control logic 430 monitors the corresponding port 310 for a host, at 502. More specifically, a pending credit FIFO buffer is monitored. Pending credits are credits to be sent to the host for use in sending a transaction. Pending credits are thus an indication of how many transactions a host can send. Stated differently pending credits are those available for use by the host. In response to a write request for the pending credit buffer, the pending credit count for the pending credit buffer is decremented, at 504. This is because a write request indicates that data is being written to the pending credit buffer, leaving fewer credits available (i.e. fewer messages that may be sent by the host).

In contrast, credit control logic 430 increments the pending credit count for a read request for the pending credit buffer, at 506. The flow of traffic may thus be controlled based, at least in part, on the pending credits, at 508.

Using method 500, pending credits may be tracked utilizing only read and write requests for the pending credit buffer. Thus, management of pending credits, and thus flow through the switch, may be simplified.

Figure 6:
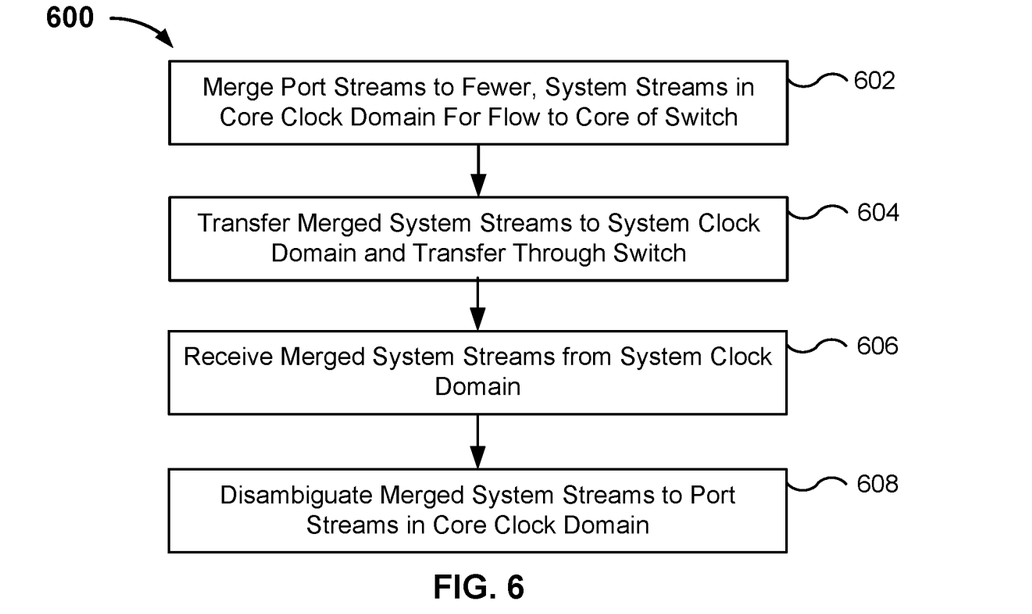
FIG. 6 is a flow-chart depicting an embodiment of a method for merging streams usable with latency-sensitive interfaces.

FIG. 6 is a flow-chart depicting an embodiment of method 600 for managing port streams that is usable with latency-sensitive interfaces. For simplicity, only some steps are shown. Further, portions of method 600 may be performed in another order, including but not limited to in parallel. Method 600 is also described in the context of a single switch 300 including port logic module 400.

For port streams (e.g. ingressing streams), the port logic module merges streams based on some criteria, at 602. Because the streams are merged by the port logic module, the merge occurs in the core clock domain. These merged streams are termed system streams because these merged streams are used to send transactions through the switch. The number of system streams is smaller than the number of port streams. Thus, the merged system streams cross the clock domain boundary into the core of the switch (i.e. the system clock domain) and are transferred through the switch, at 604.

Similarly, egressing system streams are received, at 606. Thus, the merged, system streams cross the clock domain barrier from the core of the switch (the system clock domain) to the port (the core clock domain), at 606. In the core clock domain, the merged streams are separated into their constituent streams, at 608. Thus, the individual streams are disambiguated. The streams may then be sent to the receiving interface.

For example, the port streams may include cache streams and two memory streams. The cache streams include a request stream, two response streams, and a data stream. Thus, in this example, there are six port streams. Transactions (i.e. packets or messages) for the data stream and one of the memory streams carry data in their payload. Transactions for the request and response streams and one of the memory streams do not carry data in their payload.

The six port streams are merged by port logic module 400 (e.g. merge logic 450) into two system streams, at 602. The criteria utilized by merge logic 450 in combining the port streams is whether or not the transactions in the streams carry data in their payload. Thus, at 602, the data stream and memory stream having data payload are merged by merge logic 450 into a with data stream. The request and response streams and the memory stream without the data payload are merged by merge logic 450 to a no data stream. In some embodiments, this is accomplished by first merging the request and response streams, then merging this new stream with the memory stream having no data payload. The merge also preserves identification information as to the port streams each transaction belongs to. This may be accomplished using flats. Thus, two system streams, with data and no data, are formed. In so doing, information relating to the original stream to which transactions belong is maintained.

The two system streams are transferred to the switch core for routing through the switch, at 604. Thus, the two system streams cross the clock domain barrier from the core clock domain of the port 310 corresponding to port logic module 400 to the system clock domain of the core. The system streams may be routed through the core, at 604. For example, memory 330 and switch fabric 332 may be used in routing system streams at 604.

The system streams again cross the clock domain boundary at 606. In 606, the system streams cross from the system clock domain to the core clock domain of the downstream port 310. The system streams are separated into their constituent port streams by port logic module 400 (e.g. using merge logic 450). of the downstream port, at 608. Thus, the no data stream is disambiguated into the constituent response and request streams of the cache streams and the memory stream without data payload. In so doing, information carried in the no data payload is utilized to identify the appropriate port stream for each transaction. Similarly, at 608 merge logic 450 separates the with data stream into the data stream for the cache stream and the memory stream having data payload. In so doing, information carried in the system streams is utilized to identify the appropriate port stream for each transaction. Thus, at 608 the system streams are separated into their constituent port streams.

Using method 600, port streams are merged into fewer streams for crossing the clock domain boundary and transfer through the core of the switch. As a result, congestion may be mitigated. Thus, performance of switch 300, particularly with latency-sensitive interfaces, may be improved.

Figure 7:
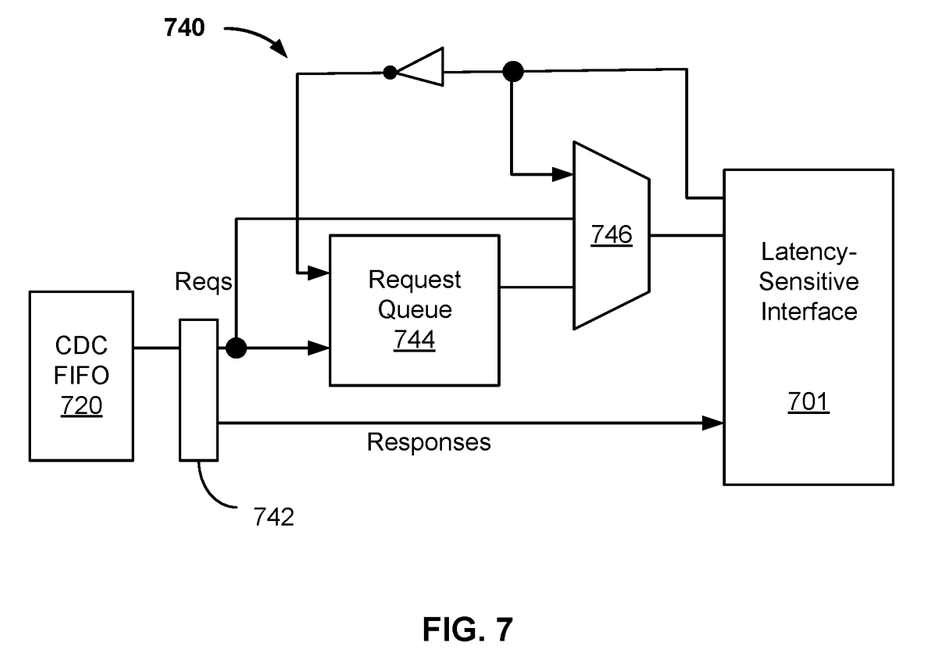
FIG. 7 depicts an embodiment of routing logic usable with latency-sensitive interfaces.

FIG. 7 depicts an embodiment of routing logic 740 usable with latency-sensitive interfaces. For clarity, only some portions of routing logic 740 are shown. Routing logic 740 is analogous to routing lotic 440 and may be part of a port logic module analogous to port logic module 400. Thus, routing logic 740 may be part of a PPL, such as PPL 312. However, in some embodiments, routing logic 740 may be used in another type of switch. Routing logic 740 is used to enforce rules. In the embodiment shown, routing logic 740 aids in ensuring that requests cannot bypass responses, but the responses can bypass request.

Routing logic 740 is coupled with CDC FIFO buffer 720, which is analogous to CDC FIFO buffer 420. Routing logic 740 includes router 742, request bypass queue 744, and arbitrator 724. Requests and responses are received from the system clock domain CDC FIFO 720. CDC FIFO 720 provides these transactions to router 742. Router 742 discriminates between responses and requests. Responses are provided directly to the latency-sensitive interface 701. When authorized to do so (e.g. based on credits), latency-sensitive interferes 701 receives the response transaction.

Router 742 sends requests to request queue 744 or directly to arbiter 746. The requests are sent to arbiter 746 if the flow is not stalled. IF the flow is stalled, then the request is sent to request bypass queue 744. Request bypass queue 744 sends request to arbiter 744. Request bypass queue 744 may be a FIFO. As a result, the oldest request may be sent to arbiter 744. When latency-sensitive interface 701 can receive a transaction, arbiter 746 sends the oldest request to latency-sensitive interface 741.

Thus, using relatively simple routing logic 740 rules related to the flow of requests and responses can be enforced by port logic modules. Consequently, the flow of traffic through switch 100 and/or 300 may be better managed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A switch, comprising:
   a plurality of ports through which transactions ingress and egress the switch;
   a plurality of port logic modules coupled with the plurality of ports, each port logic module having core clock domain logic for a core clock domain specific to a corresponding port of the plurality of ports, and wherein each port control logic module controls flow through the corresponding port for a host via credit granting, the port control logic module configured to decrement a pending credit count for the host based on a write request for a pending credit buffer and increment the pending credit count for a read request for the pending credit buffer; buffer, wherein at least one port logic module of the plurality of port logic modules is further configured to:
   combine a first number of port streams from the corresponding port to a second number of system streams;
   transfer the second number of system streams into a system clock domain and through the system clock domain;
   transfer the second number of system streams from the system clock domain to the core clock domain; and
   separate the second number of system streams into the first number of port streams;
   a memory including a plurality of banks; and
   a switch fabric, wherein the memory and the switch fabric have the system clock domain, the core clock domain for each of the plurality of port logic modules being different from the system clock domain.

2. The switch of claim 1, wherein each of the plurality of port logic modules includes a clock domain crossing (CDC) first-in-first-out (FIFO) buffer, the CDC FIFO buffer being configured to manage a transition between the core clock domain and the system clock domain.

3. The switch of claim 1, wherein the second number of system streams includes a with data stream and a no data stream, the with data stream corresponding to transactions including a data payload, the no data stream corresponding to the transactions free of the data payload.

4. The switch of claim 3, wherein the port streams include cache streams and memory streams, the cache streams including a request stream, a plurality of response streams, and a data stream, the data stream being merged with a first memory stream having data payload into the with data stream, the request stream, the plurality of response streams, and a second memory stream not having the data payload being merged into the no data stream.

5. The switch of claim 1, wherein each port control logic module includes routing logic, the routing logic configured to allow a response transaction to bypass a request transaction and to prevent the request transaction from bypassing the response transaction.

6. The switch of claim 5, wherein the routing logic including a router, a request bypass queue coupled to the router, and an arbitrator coupled with the router and the request bypass queue, the router configured to route the response transaction to an interface coupled with the corresponding port, to route the request transaction to the arbitrator if the interface can receive transactions, and to route the request transaction to the request bypass queue if the interface cannot receive the transactions, the arbitrator configured to forward an older request transaction from the router or the request bypass queue.

7. The switch of claim 1, wherein the switch is a Compute Express Link Internet Protocol (CXL IP) switch.

8. A method, comprising:
   receiving a transaction in a port of a plurality of ports of a switch, the switch also including a plurality of port logic modules and a core portion, the core portion including a switch fabric and a memory, the plurality of port logic modules being coupled with the plurality of ports, a port logic module of the plurality of port logic modules being coupled with the port, the core portion of the switch having a system clock domain, wherein each port control logic module controls flow through the port for a host via credit granting, the port control logic module configured to decrement a pending credit count for the host based on a write request for a pending credit buffer and increment the pending credit count for a read request for the pending credit buffer; and
   controlling, using the port logic module, routing of the transaction through the core portion, the port logic module having core clock domain logic for a core clock domain specific to the port and different from the system clock domain, wherein the controlling further comprises:
      combining a first number of port streams from the port to a second number of system streams;
      transferring the second number of system streams into the system clock domain and through the system clock domain;
      transferring the second number of system streams from the system clock domain to a core clock domain; and
      separating the second number of system streams into the first number of port streams.

9. The method of claim 8, wherein each of the plurality of port logic modules includes a clock domain crossing (CDC) first-in-first-out (FIFO) buffer, the CDC FIFO buffer being configured to manage a transition between the core clock domain and the system clock domain.

10. The method of claim 8, wherein the second number of system streams includes a with data stream and a no data stream, the with data stream corresponding to transactions including a data payload, the no data stream corresponding to the transactions free of the data payload.

11. The method of claim 10, wherein the port streams include cache streams and memory streams, the cache streams including a request stream, a plurality of response streams, and a data stream, and wherein the combining further includes:
      merging the data stream with a first memory stream having the data payload into the with data stream; and
      merging the plurality of response streams, the request stream and a second memory stream not having the data payload into the no data stream.

12. The method of claim 8, wherein each port control logic module includes routing logic, the controlling further including:
      allowing, using the routing logic, a response transaction to bypass a request transaction; and
      preventing, using the routing logic, the request transaction from bypassing the response transaction.

13. The method of claim 12, wherein the routing logic including a router, a request bypass queue coupled to the router, and an arbitrator coupled with the router and the request bypass queue, the router configured to route the response transaction to an interface coupled with the port, to route the request transaction to the arbitrator if the interface can receive transactions, and to route the request transaction to the request bypass queue if the interface cannot receive the transactions, the arbitrator configured to forward an older request transaction from the router or the request bypass queue.

14. The method of claim 8, wherein the switch is a Compute Express Link Internet Protocol (CXL IP) switch.

* * * * *